(No Model.)
N. A. DICKINSON.
TROLLING HOOK.
No. 295,369. Patented Mar. 18, 1884.
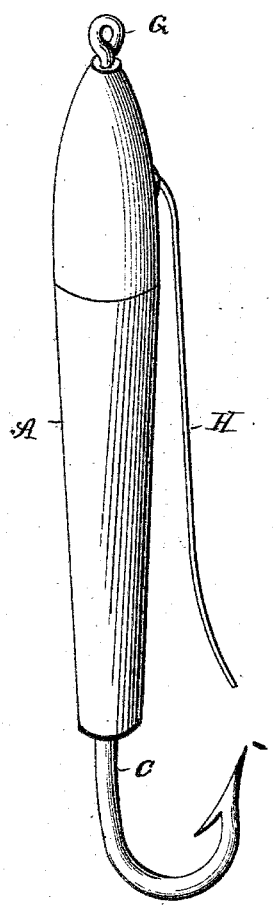
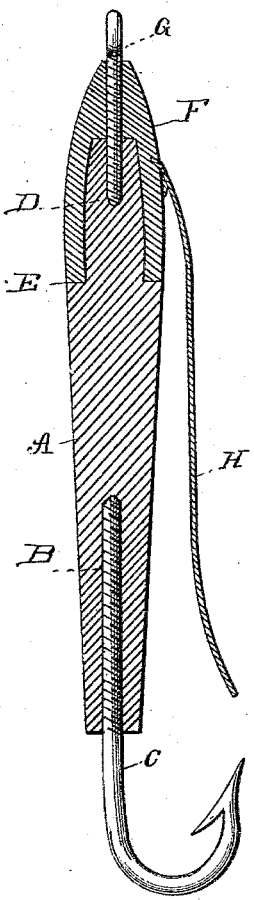
WITNESSES:
Fred. G. Dieterich.
J. Fred. Reily.
Newton A. Dickinson
INVENTOR.
By Louis Bagger & Co.
ATTORNEYS.

UNITED STATES PATENT OFFICE.

NEWTON A. DICKINSON, OF CHESTER, CONNECTICUT.

TROLLING-HOOK.

SPECIFICATION forming part of Letters Patent No. 295,369, dated March 18, 1884.

Application filed October 4, 1883. (No model.)

*To all whom it may concern:*

Be it known that I, NEWTON A. DICKINSON, a citizen of the United States, and a resident of Chester, in the county of Middlesex and State of Connecticut, have invented certain new and useful Improvements in Trolling-Hooks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved trolling-hook, and Fig. 2 is a longitudinal section of the same.

Similar letters of reference indicate corresponding parts in all the figures.

My invention has relation to that class of trolling-hooks which consist of a stick, into the ends of which the shanks of the hook and the eye to which the line is attached are inserted, and having a sinker secured to the upper end of the stick and a spring-fender; and it consists in the improved construction and combination of parts of the same, as hereinafter more fully described and claimed.

In the accompanying drawings, the letter A indicates a tapering stick, of wood or similar material, (rubber, horn, ivory, bone, or any material of similar character,) having a socket, B, in its lower end, into which the upper screw-threaded end of the hook C is secured, and having a reduced upper end, D, forming a shoulder, E, over which reduced upper end a cap, F, of lead or similar heavy metal, is placed, having an aperture in its upper end, through which an eyed screw, G, passes into the end of the reduced part of the stick, holding the cap or socket in place, and forming an eye for the attachment of the line. A spring rod or fender, H, is secured in the side of the cap, and its end reaches near to and in line with the end of the hook, serving to fend off any sea-weeds or similar objects which the hook may meet with, while it is sufficiently elastic not to interfere with the catching of the fish which bites on the hook.

It will be seen that a hook which is simple of construction and convenient for attaching it to the line is provided, the wooden stick forming easy means for attaching the hook and the eye into which the line is inserted, and the reduced portion of the stick forming convenient means for attaching the weight, which is held in place by the eyed screw.

Having thus described my invention, I claim and desire to secure by Letters Patent of the United States—

The combination of a tapering stick having its upper portion reduced to form a shoulder, and having screw-threaded sockets in the ends of the same, a hook having a screw-threaded shank inserted into the lower end of the stick, a cap of heavy metal fitting over the reduced end of the stick, an eyed screw fitting into the upper end of the stick and holding the cap in place, and a flexible or elastic rod or fender fastened into the side of the cap and extending down to near the point of the hook, as and for the purpose shown and set forth.

In testimony that I claim the foregoing as my own I have hereunto affixed my signature in presence of two witnesses.

NEWTON A. DICKINSON.

Witnesses:
WM. H. SULLIVAN,
GILBERT SULLIVAN.